UNITED STATES PATENT OFFICE.

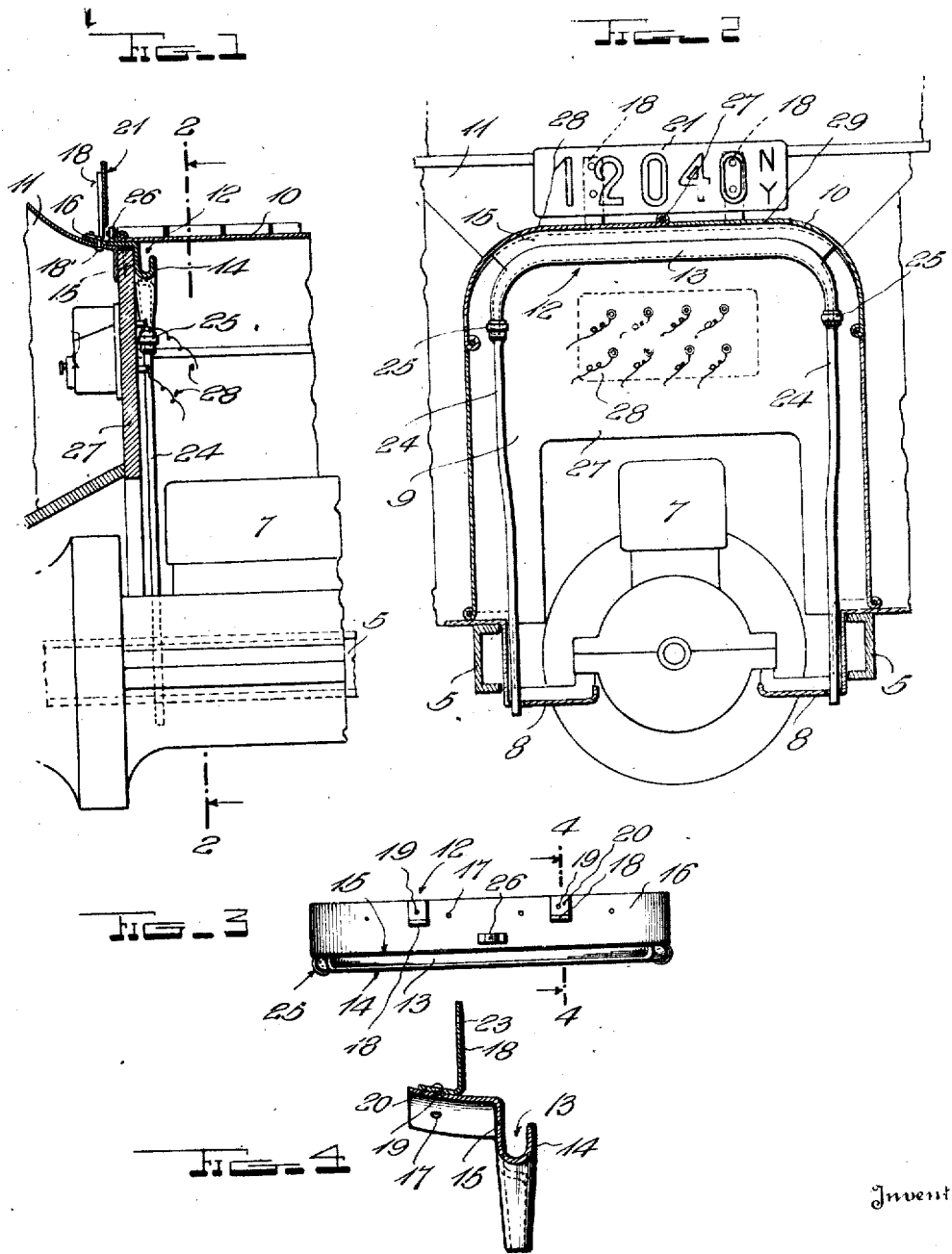

WILLIAM B. LADD, OF KINGSTON, TENNESSEE.

AUTOMOBILE-COWL ATTACHMENT 1,269,462.

Specification of Letters Patent.

Patented June 11, 1918.

Application filed November 12, 1917. Serial No. 201,712.

*To all whom it may concern:*

Be it known that I, WILLIAM B. LADD, a citizen of the United States and a resident of Kingston, in the county of Roane and State of Tennessee, have invented new and useful Improvements in Automobile-Cowl Attachments, of which the following is a specification.

This invention relates to automobile cowl attachments, and has for an important object to provide in a device of this character a means whereby water, collected upon the cowl of the automobile when exposed to the falling rain, may be trapped and conveyed to a remote point, thus eliminating the possibility of the water entering the engine compartment and contacting with the various electrical connections and circuits employed particularly in the ignition system of the prime mover of the automobile, whereupon short circuiting of the electrical circuits and other undesirable effects resulting from the contacting of water with the same may be eliminated.

A further object of the invention is to provide a device of the above mentioned character adapted to be easily installed upon or applied to automobile cowls without altering the construction thereof.

A further object of the invention is to provide a device of the above mentioned character which is simple in construction, inexpensive to manufacture, strong, durable, and effective in operation.

Other objects and advantages of the invention will be apparent during the course of the following description.

In the accompanying drawings forming a part of this specification and in which like numerals are employed to designate like parts throughout the same, Figure 1 is a longitudinal sectional view of an automobile cowl embodying my invention, Fig. 2 is a vertical transverse sectional view of Fig. 1 taken on line 2—2, Fig. 3 is a top plan of the device, and Fig. 4 is a cross-sectional view of Fig. 3 taken on line 4—4.

In the drawings, wherein for the purpose of illustration is shown a preferred embodiment of my invention, the numeral 5 indicates the chassis of an automobile on which is mounted a body as shown and supports a prime mover indicated by the numeral 7. The chassis 5 is provided with the ordinary or conventional type of dust-pan 8 suspended from the chassis 5 as clearly shown in Fig. 2.

As an inclosure for the engine compartment 9 there is provided the conventional type of hood 10, one end of which is adapted to be supported by the cowl 11 to which I propose to attach my device as shown in Fig. 1 and indicated as a whole by the numeral 12. This device comprises a trough 13 preferably formed of metal and bent to a substantially U-shape in cross-section as clearly shown in Fig. 4. This trough comprises side members 14 and 15, the side member 15 being substantially wider than that indicated by the numeral 14. To the upper edge of the side member 15 there is attached, and preferably formed integral therewith, a flange 16 which is suitably curved to snugly fit upon the cowl 11. This flange is provided with a plurality of openings 17 and adapted to receive therein rivets or the like as indicated by the numeral 18', which rivets serve to secure the flange firmly in position upon the cowl 11. Upon the upper face of the flange 16 there is disposed and secured thereto a pair of brackets 18 by means of rivets or the like 19 passed through the feet 20 of the brackets 18 as shown. These brackets are adapted to support a license plate 21 which is secured thereto by means of rivets or the like passed through the license plate and openings 23 provided by the brackets 18.

Each end of the trough 13 is provided with a, preferably rubber, tube 24 and is secured to the same by any suitable coupling as indicated by the numeral 25. Each of these rubber tubes extend downwardly through the engine compartment 9 and project through the dust-pan 8 as shown in Fig. 2.

Upon the upper face of the flange 16 there is disposed a keeper 26 which is adapted to receive a hinged rod 27, hingedly connecting sections 28 and 29 of the hood 10.

In use the operation of my device is as follows: Should the automobile be exposed to falling rain, the water collecting upon the cowl 11 flows down the same, seeking a passage into the engine compartment 9. When the water thus traveling into the engine compartment enters the same it flows over the flange 16 and into the trough 13 whereupon it travels toward each end of the same. When the water, thus trapped within the trough 13, reaches the ends of the same it is conveyed therefrom through the pipes or tubes 24 and expelled into the open below the dust-pan 8.

It is obvious that should my device be not applied to the automobile cowl the water would be permitted to enter the engine compartment 9 and creep or flow downwardly over the face of the automobile dash 27, thereby contacting with electrical connections or conductors 28 causing a short circuit and thereby impairing such function as the electrical conductors are designed to perform in the operation of the automobile.

It is to be understood that various changes in the shape, size and arrangement of parts may be resorted to without departing from the spirit of my invention or the scope of the subjoined claims.

Having thus described my invention, what I claim as new and desire to secure and protect by Letters Patent of the United States, is:

1. The combination with an automobile having a cowl of a trough bent at the ends thereof to a substantial arcuate shape to conform to the shape of the cowl, said trough being provided with two sides, one of which is substantially wider than the other; a flange carried at the upper edge of the wider of said flanges; and tubes connected to the ends of said trough for conveying water from the trough to a remote point.

2. The combination with an automobile having a cowl of a trough bent downwardly at the ends thereof and provided with cups for collecting water from said trough, said trough being provided with two sides, one of which is substantially wider than the other; a flange carried at the upper edge of the wider of said flanges and adapted for connection with the cowl; and tubes connected to the ends of said trough for conveying water collected in said cups to a remote point.

WILLIAM B. LADD.